United States Patent [19]

Takao

[11] Patent Number: 4,690,269

[45] Date of Patent: Sep. 1, 1987

[54] APPARATUS FOR TRANSFERRING SHAPED ARTICLES

[75] Inventor: Kenji Takao, Utsunomiya, Japan

[73] Assignee: Rheon Automatic Machinery Co., Ltd., Utsunomiya, Japan

[21] Appl. No.: 824,885

[22] Filed: Jan. 31, 1986

[30] Foreign Application Priority Data

Feb. 1, 1985 [JP] Japan .................................. 60-16598

[51] Int. Cl.⁴ .......................... A21C 9/08; B65G 23/00
[52] U.S. Cl. .................................... 198/460; 198/461; 198/572; 198/575; 198/577
[58] Field of Search .................... 53/74, 251, 493, 534; 198/424, 425, 431, 460, 461, 464.2, 572, 575, 577

[56] References Cited

U.S. PATENT DOCUMENTS 4,514,963  5/1985  Bruno .................................... 53/493

FOREIGN PATENT DOCUMENTS 12211  2/1981  Japan .................................... 198/575

*Primary Examiner*—Andres Kashnikow
*Attorney, Agent, or Firm*—Finnegan, Henderson, Farabow, Garrett & Dunner

[57] ABSTRACT

An apparatus for transferring shaped articles comprising, a first conveyor for conveying shaped articles at a constant speed, a detecting unit disposed at a predetermined position above the first conveyor so as to detect the shaped articles being conveyed on the first conveyor, a second conveyor for conveying at a variable speed trays spaced apart a predetermined distance from each other, the second conveyor being disposed beneath and opposite to the delivery end of the first conveyor, a rotary encoder coupled to the second conveyor; and a control device which receives information from the detecting unit, information from the rotary encoder, and information concerning the positions of the shaped articles placed on the trays. The control device controls the speed of the second conveyor on the basis of the above three kinds of information, whereby the shaped articles are automatically transferred onto the trays.

1 Claim, 5 Drawing Figures

APPARATUS FOR TRANSFERRING SHAPED ARTICLES

BACKGROUND OF THE INVENTION

1. Field of the Invention

This invention relates to a transferring apparatus by which articles, which are formed by cutting dough of pizza, bread, confectionery, or like food, into pieces of predetermined size, or by further processing pieces of such dough, can be transferred onto trays spaced apart from each other by a predetermined distance, and more particularly, to an apparatus by which articles, which are formed into pieces of a predetermined shape and conveyed on a conveyor, can be transferred to accurate points on trays even when the interval between the articles is not uniform.

2. Description of Prior Art

An apparatus for conveying bread, confectionery or the like, which is formed into pieces of a predetermined shape by a shaping device or the like, by a conveyor, and for transferring the articles from that conveyor onto another conveyor, is disclosed in, for example, U.S. Pat. No. 4,372,438 (patented on Feb. 8, 1983) and U.S. Pat. No. 4,024,945 (patented on May 24, 1977).

In the apparatus of the first-mentioned patent, a combination of a table with a plurality of slits, a vertically displaceable rotating shaft, and a plurality of flanges on the rotating shaft is positioned between a feed conveyor and a receiving conveyor, the flanges movable through the slits so that they can be above or below the slits, and soft objects irregularly conveyed on the feed conveyor are temporarily stopped by lowering the rotating flanges to a point below the slits and an object is then caused to be transferred to the receiving conveyor by elevating the flanges, thereby adjusting the intervals between objects transferred to the receiving conveyor. This apparatus is not suitable for transferring objects to a tray.

In the apparatus disclosed in the last-mentioned Patent, articles supplied from the shaping device, which articles keep a uniform and predetermined interval therebetween, are arrayed on a plate of a transferring device to keep a fixed interval therebetween, and the articles are then dropped to be transferred onto a tray or the like in a row parallel with the direction of the tray. Thus, although the transferring operation can be carried out accurately, the articles do not always land on the tray stably, and, in addition, to properly set the transfer timing is relatively difficult. Further, the transferring device is complex in construction, leading to high costs.

Also, especially when the use of a baking plate is required for baking these articles, the articles must be accurately placed in the recesses of a predetermined shape formed on the baking plate. In such a case, it is difficult for the aforementioned transferring device to accurately transfer the articles into the recesses of the baking plate.

SUMMARY OF THE INVENTION

It is an object of the present invention to provide an apparatus by which shaped articles conveyed in a non-uniformly arrayed state on a conveyor can be automatically transferred to a predetermined position on a tray.

In accordance with the present invention, there is provided an apparatus for transferring shaped articles comprising a first conveyor for conveying shaped articles at a constant speed; a detecting unit disposed at a predetermined position above the first conveyor to detect the shaped articles being conveyed on the first conveyor; a second conveyor for conveying at a variable speed trays spaced apart a predetemined distance from each other, the second conveyor being disposed beneath and opposite to the delivery end of the first conveyor; a rotary encoder coupled to the second conveyor; and a control means which receives information from the detecting unit, information from the rotary encoder, and information concerning the positions of the shaped articles to be placed on the trays, the control means controlling the speed of the second conveyor on the basis of the above three kinds of information, whereby the shaped articles are automatically transferred onto the trays.

The detecting unit transmits to the control means information on the detected articles being conveyed on the first conveyor. The second conveyor is driven by a driving device which can vary the conveying speed, and the drive shaft of the driving device is coupled to the rotary encoder which transmits the conveying speed information to the control means. In the transferring apparatus of the present invention, information directing the arrangement of articles on the trays in transmitted to the control means. When the articles being conveyed on the first conveyor are detected by the detecting unit, the speed of the second conveyor is controlled in response to information which is made by the control means on the basis of a signal from the detecting unit, pulses from the rotary encoder, and the article arrangement information, so that the article can be transferred to predetermined positions on the trays. Even when the interval between the articles is not uniform, the speed of the second conveyor can be easily controlled.

Further, in another mode of the present invention, the second conveyor for conveying trays can be kept at constant speed, and the first conveyor for conveying shaped articles can be kept at a variable speed, so that the shaped articles are automatically transferred onto the trays.

DESCRIPTION OF THE PREFERRED EMBODIMENT

Figure 1:
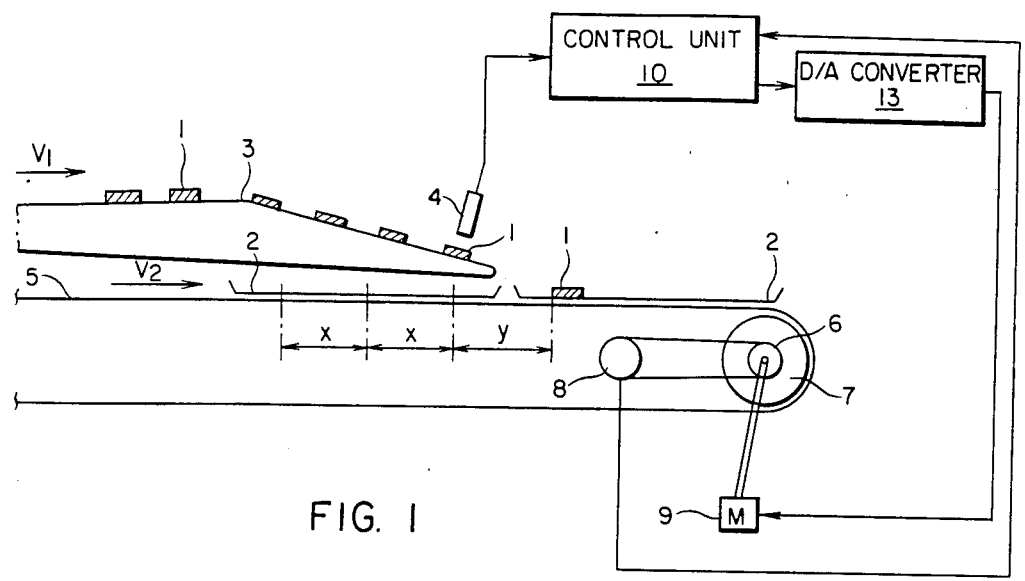
FIG. 1 is a schematic side elevation view showing the construction of the the transferring apparatus of the present invention.

An embodiment of the transferring apparatus of the present invention will be described by reference to the drawings. As shown in FIG. 1, the apparatus of the present invention comprises a first conveyor 3 for conveying shaped articles 1, and a second conveyor 5 conveying trays 2 that keep a fixed interval therebetween.

The first conveyor 3 is coupled to a shaping device, positioned upstream of it, such as a cutting device or a rounding device providing the shaped articles 1, and receives the shaped articles 1 therefrom and conveys them at a constant speed. An article detecting device 4, such as a photo-electric tube, is disposed at a position a certain distance upstream of the delivery end of the first conveyor 3.

The second conveyor 5, conveying the trays 2, which trays 2 receive the articles 1 from the delivery end of the first conveyor 3, is driven by a driving roll 7 mounted on a drive shaft 6, and a motor 9 of a variable speed type drives the shaft 6.

Further, a rotary encoder 8 is coupled to the drive shaft 6 to transmit the information on the rotation of the shaft 6, namely, the information on the speed of the second conveyor 5, to a control means 10.

The detection information from the detecting device 4 is also transmitted to the control means 10.

Figure 2:
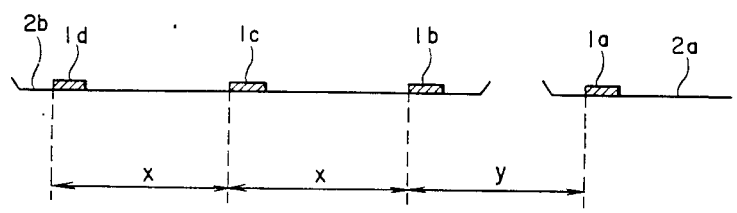
FIG. 2 is a sectional view showing the arrangement of articles on the trays.

The relation between the trays 2 and the position of the articles 1 to be placed on the trays 2 is pre-set as shown in FIG. 2. The trays 2 are conveyed on the tray conveyor 5 with the interval between the trays 2a and 2b being kept uniform. In the following description, it is assumed that the interval between the articles 1 placed on the trays 2 is x, and the interval between the trailing article 1a on the tray 2a and the leading article 1b on the tray 2b is y.

Figure 5:
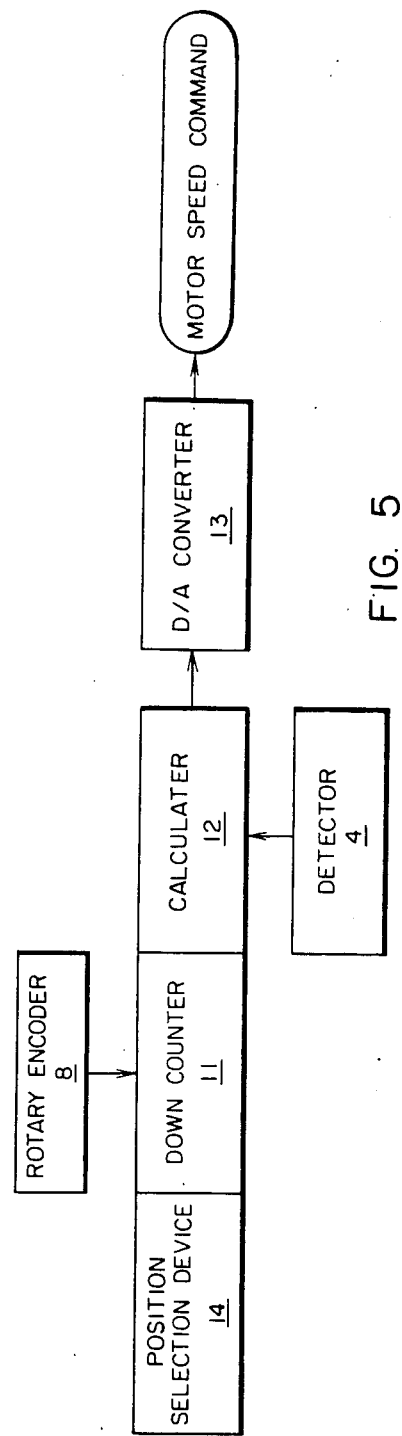
FIG. 5 is a block diagram showing the structure of the control device.

The control means 10 used in the present invention has a structure as, for example, shown in FIG. 5.

The control means 10 includes a down counter 11 whose inputs are the output signal of the rotary encoder 8, and signals from a position selection device 14. A calculator 12 is connected to the down counter 11, and receives information from the down counter 11. Article detection information from the article detecting device 4 is also transmitted to the calculator 12.

The calculator 12 calculates the values applied from the down counter 11 and the article detecting device 4, and generates a signal directing the rotation speed of the drive motor 9. This signal is transmitted to a D/A converter 13, connected to the calculator 12. The D/A converter 13 converts the digital signals into an analog signal and sets the speed of the tray conveyor 5 as directed.

How to control the transferring apparatus of the present invention will now be described with reference to FIGS. 2, 3, and 4. As already described, it is assumed that the interval between the articles 1b and 1c on the tray 2b is x, and the interval between the trailing article 1a on a leading tray 2a and the leading article 1b on the next tray 2b is y. It is also assumed that the speed of the first conveyor 3 is $V_1$ (a constant speed), and that of the second conveyor 5 is $V_2$ (a variable speed). Transfer of the articles onto the trays 2 with the pitch of x, will now be described.

Figure 3:
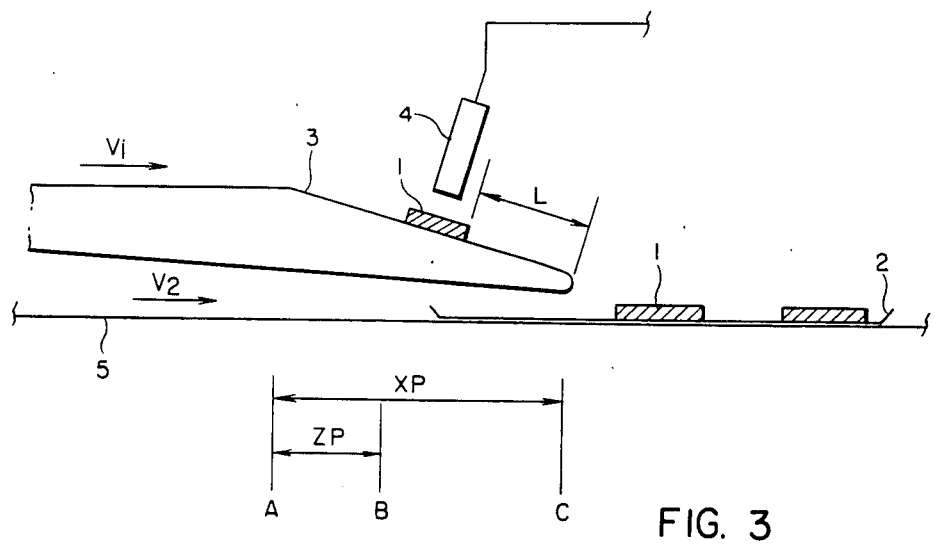
FIG. 3 illustrates how the articles are transferred in the apparatus of the present invention.

As shown in FIG. 3, the distance between the article detecting device 4 associated with the article conveyor 3 and the delivery end of the first conveyor 3 is set at L. The second conveyor 5 is a chain conveyor on which trays 2 of predetermined dimensions can be arrayed at a predetermined interval. Distances of travel of the chain conveyor correspond to the numbers of pulses generated from the rotary encoder 8. Therefore, the movement of the conveyor can be controlled based on the numbers of pulses, namely, by selecting the numbers of pulses corresponding to the distance which a certain point moved from one position to another.

Since the tray 2 is in a positional relationship with the conveyor abovementioned, the position of the desired point on the tray 2 can be defined by the numbers of pulses.

When the position on the second conveyor 5 onto which the article 1 is to be transferred reaches the position shown by A in FIG. 3, which position is arbitrarily chosen, a down-counting of pulses begins, and when it reaches the position shown by C in FIG. 3, which position coincides with the delivery end of the first conveyor 3, the counting of pulse reaches zero. The number of pulses indicative of the information on the distance between points A and C is defined as xp. The number of pulses to xp is selected by a position selection device 14 in the control means 10.

Then, assume, for example, that the article placing position on the tray 2 reaches point B when the article 1 being conveyed on the article conveyor 3 is detected by the article detecting device 4. The number of pulses remaining in the down counter 11 is expressed by:

$$xp-zp$$

where zp is the number of pulses corresponding to the distance between points A and B, and the remaining pulse number provides a factor for changing the speed of the tray conveyor 5.

In other words, the time $T_1$ required for the article 1 to move from the point where it is detected on the first conveyor 3 to the delivery end is expressed as:

$$T_1 = L/V_1$$

Wherein L is an explained earlier and $V_1$ is the velocity of the first conveyor 3. The length of time $T_2$ required for the article placing position of the tray 2 to move from point B to the delivery end should also be set at:

$$T_2 = (x-z)/V_2$$

The time $T_1$ must be equal to $T_2$, accordingly, from the above two expressions, the required speed $V_2$ of the second conveyor 5 is computed by a formula:

$$V_2 = (x-z)V_1/L$$

The rotation speed of the motor driving the second conveyor 5 is determined on the basis of the speed $V_2$ given by the above expression. Thus, the rotation speed of the motor is controlled by the number of pulses (xp-zp) remaining in the down counter 11.

Also, when an article is to be placed on the first spot on a trailing tray 2b, point A is to be selected so as to give the number of pulses yp corresponding to the value of y. The selection of the number of pulses yp is made by the position selection device 14 as in the case of xp. The remaining process is similar to that for x.

Figure 4:
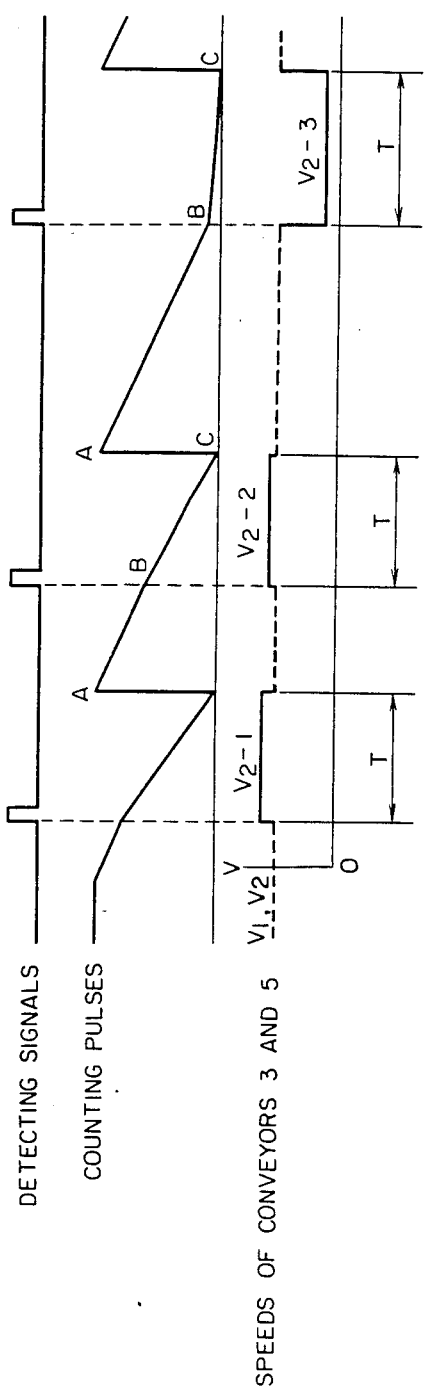
FIG. 4 illustrates the relation between the output of the down counter and the speeds (V) of the first and second conveyors.

In the apparatus of the present invention, therefore, the conveying speed $V_2$ of the second conveyor 5 is controlled in a manner as shown in FIG. 4, thereby transferring the article onto a tray from the delivery end of the first conveyor 3. Detection signals from the detector 4 are shown as a comb like line, and the down counting of pulses is shown as a saw-tooth-form line in FIG. 4. The figure A shows the position at which the down counting begins, and the figure B shows the position at which the article 1 is detected. The figure C shows a position at which the article 1 is transferred to the tray 2. Calculation of the speed of the conveyor 5 in the time span between point B and point C is conducted by the calculator 12 and the count down during this time span is accelerated or slowed down according to the calculation. In FIG. 4 this time span is shown as T, which is a constant value, and the speed of the count down during this time span is indicated by the inclination of the line B-C. In FIG. 4, point A is set so as to coincide with point C, so that when the count down reaches zero, the down counting begins. The dotted horizontal line shows the speeds of the first and second conveyors 3 and 5. Both conveyors are run at the same speed during the time span between point A and point B. The speeds of the second conveyor 5 during the time span T are shown as $V_{2\text{-}1}$, $V_{2\text{-}2}$, and $V_{2\text{-}3}$ using solid lines. At the time of the article delivery, the speed $V_2$ of the second conveyor 5 is equal to the speed $V_1$ of the first conveyor 3. When the number of pulses remaining in the down counter 11 is small, the speed $V_2$ of the second conveyor 5 is decreased as shown at $V_{2\text{-}3}$, while, when the number of the remaining pulses is large, the speed $V_2$ is increased as shown at $V_{2\text{-}1}$, $V_{2\text{-}2}$, respectively.

When the interval between an article and the preceding article conveyed on the first conveyor 3 is too large, so that the article does not arrive at the delivery end of the first conveyor 3 when the number of pulses remaining in the down counter 11 has decreased to zero, the position of the tray, onto which the article is to be transferred, is skipped, and the tray is advanced to the next position, so that the articles can be placed on that position.

When the article 1 on the first conveyor 3 is not detected by the detecting device 4 after a predetermined length of time, the second conveyor 5 is arranged to automatically stop. When the article 1 is again conveyed on the conveyor 3, the conveyor 5 begins to convey.

In apparatus of the present invention, even when articles are not spaced apart by a constant distance on the first conveyor 3, the articles can be accurately transferred to predetermined positions on the trays, and the control for that purpose can be readily attained.

In the aforementioned embodiment of the present invention, the trays may be those having a planar bottom plate, but the present invention is especially useful when those having recesses capable of accommodation of articles to be baked are employed. Further, the material of the articles transferred onto the trays may be dough of bread or confectionery. The present invention is also equally and effectively applicable where these articles lined up in a longitudinal line are conveyed on the article conveyor, or a where a plurality of lines of articles are conveyed while they form rows in the transverse direction of the conveyor.

In the aforementioned embodiment of the present invention, the second conveyor 5 conveying the trays 2 is designed to travel at a variable speed, and the first conveyor 3 conveying the articles 1 is designed to travel at a constant speed. It is apparent, however, that even in a contrary case where the second conveyor 5 travels at a constant speed and the first conveyor 3 travels at a variable speed, the manner of control by the control device of the apparatus of the present invention is similar to that described above, so that the articles can be successively transferred from the first conveyor 3 onto article accommodation portions formed on the trays of the second conveyor 5, which is kept at a constant speed.

Further, a commonly employed control device, such as a microcomputer widely used hitherto in the art, can be used instead of the control means 10 comprising the culculator 12, the down counter 11, and the position selection device 14.

The article transfer can be achieved by merely controlling the speed of either the second conveyor 5 or the first conveyor 3 on the basis of the signals from the control means. Therefore, the overall construction of the apparatus of the present invention can be simplified.

I claim:

1. An apparatus for transferring shaped articles comprising:

a first conveyor for conveying shaped articles at a constant speed;

a detecting unit disposed at a predetemined position above the first conveyor so as to detect the shaped articles being conveyed on the first conveyor;

a second conveyor for conveying at a variable speed trays spaced apart a predetermined distance from each other, the second conveyor being disposed beneath and opposite to the delivery end of the first conveyor;

a rotary encoder coupled to the second conveyor; and a control means which receives information from the detecting unit, information from the rotary encoder, and information concerning the positions of the shaped articles to be placed on the trays, the control means controlling the speed of the second conveyor on the basis of the above three kinds of information, whereby the shaped articles are automatically transferred onto the trays in a relation spaced apart a predetermined distance from each other.

* * * * *